United States Patent [19]

Eberle

[11] Patent Number: 4,784,380
[45] Date of Patent: Nov. 15, 1988

[54] AUTOMATIC BATTERY STACKER

[75] Inventor: William J. Eberle, Irving, Tex.

[73] Assignee: General Battery Corporation, Reading, Pa.

[21] Appl. No.: 16,199

[22] Filed: Feb. 18, 1987

Related U.S. Application Data

[62] Division of Ser. No. 680,782, Dec. 12, 1984, Pat. No. 4,728,093, which is a division of Ser. No. 390,806, Jun. 22, 1982, Pat. No. 4,534,549.

[51] Int. Cl.⁴ .............................................. B65H 3/08
[52] U.S. Cl. .................................................... 271/103
[58] Field of Search ........................... 271/3, 5, 11–15, 271/9, 91, 93, 103

[56] References Cited

U.S. PATENT DOCUMENTS

| | | | |
|---|---|---|---|
| 2,558,685 | 6/1951 | Honig | 270/53 |
| 2,626,038 | 1/1953 | Smith | 193/35 |
| 2,704,593 | 3/1955 | Galloway | 198/35 |
| 2,790,536 | 4/1957 | Reed | 198/35 |
| 2,850,279 | 9/1958 | Stoothoff | 271/103 |
| 2,930,476 | 3/1960 | Andrews | 198/35 |
| 3,013,796 | 12/1961 | Currie | 271/9 |
| 3,091,995 | 6/1963 | Allison | 271/103 X |
| 3,334,891 | 8/1967 | Clausen | 271/12 |
| 3,527,367 | 9/1970 | Bivans | 214/8.5 |
| 3,934,916 | 1/1976 | Baker | 271/103 |
| 3,937,458 | 2/1976 | Langen | 271/95 |
| 3,957,263 | 5/1976 | Christl | 271/102 |
| 3,967,358 | 7/1976 | Orlando | 29/204 R |
| 3,982,624 | 9/1976 | Eberle | 198/486 |
| 3,993,301 | 11/1976 | Vits | 271/98 |
| 4,168,772 | 9/1976 | Eberle | 198/421 |
| 4,403,770 | 9/1983 | Ferguson | 271/103 X |

FOREIGN PATENT DOCUMENTS

| | | | |
|---|---|---|---|
| 17174 | 8/1965 | Japan | |
| 4840 | 1/1982 | Japan | 271/103 |

OTHER PUBLICATIONS

IBM Technical Disclosure Bulletin, vol. 24, No. 5, pp. 2526, 2527: "Pressure/Vacuum Sensing Device", K. lt. Westermann.

Primary Examiner—Richard A. Schacher
Attorney, Agent, or Firm—Benasutti & Murray

[57] ABSTRACT

Apparatus for automatically stacking battery plates and separators is disclosed. Battery plates and separators elements are alternately and automatically combined on a conveyor belt to form sandwiches wherein a plurality of such sandwiches are later assembled for use in battery cells. Prior to combining the elements, the plates and separators are arranged in respective chutes for access by pivotably mounted vacuum pickup heads, which cycle between the chutes and the conveyor belt. The vacuum pickup heads capture the topmost elements in the chutes irrespective of the height at which the plates and separators may be stacked therein. In order to access the elements within the chutes, a jet sensor is provided with the pickup head that acts as a proximity detector. When vacuum is not being utilized for pickup purposes, it is utilized in an environmental mode where it is used to remove lead dust and particles around the stacking area.

3 Claims, 10 Drawing Sheets

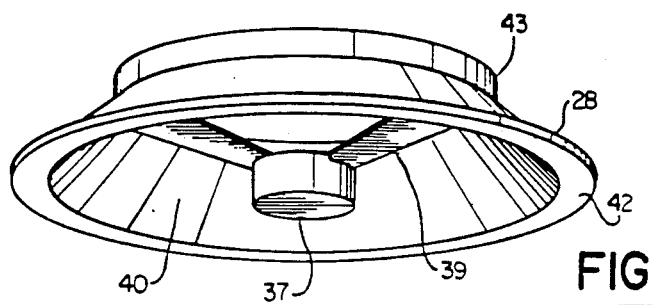
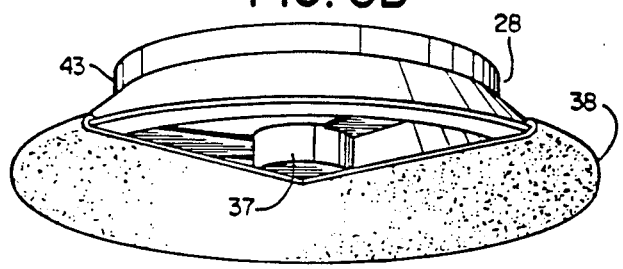
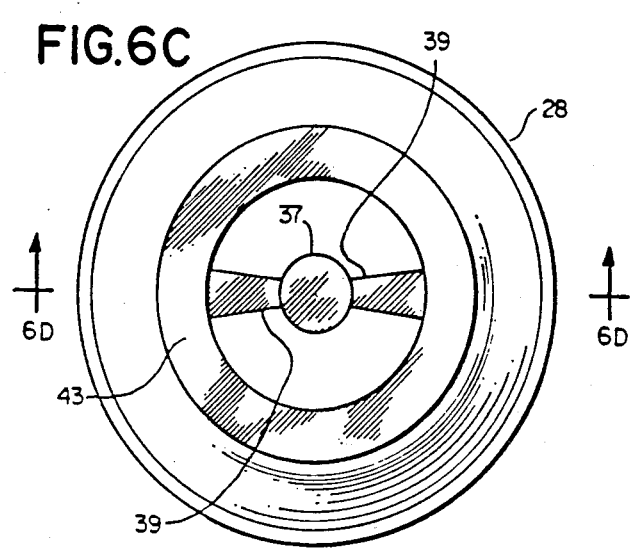
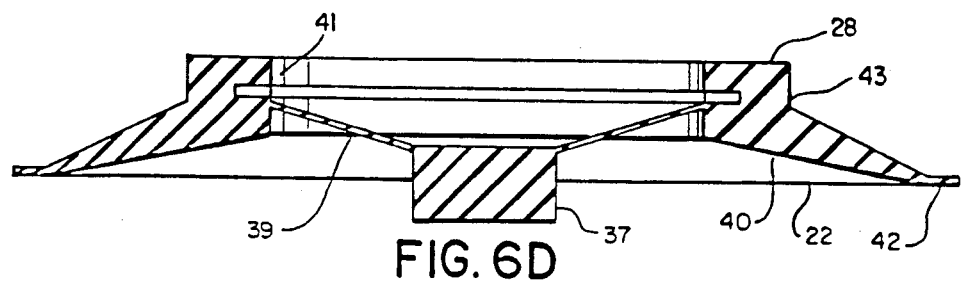

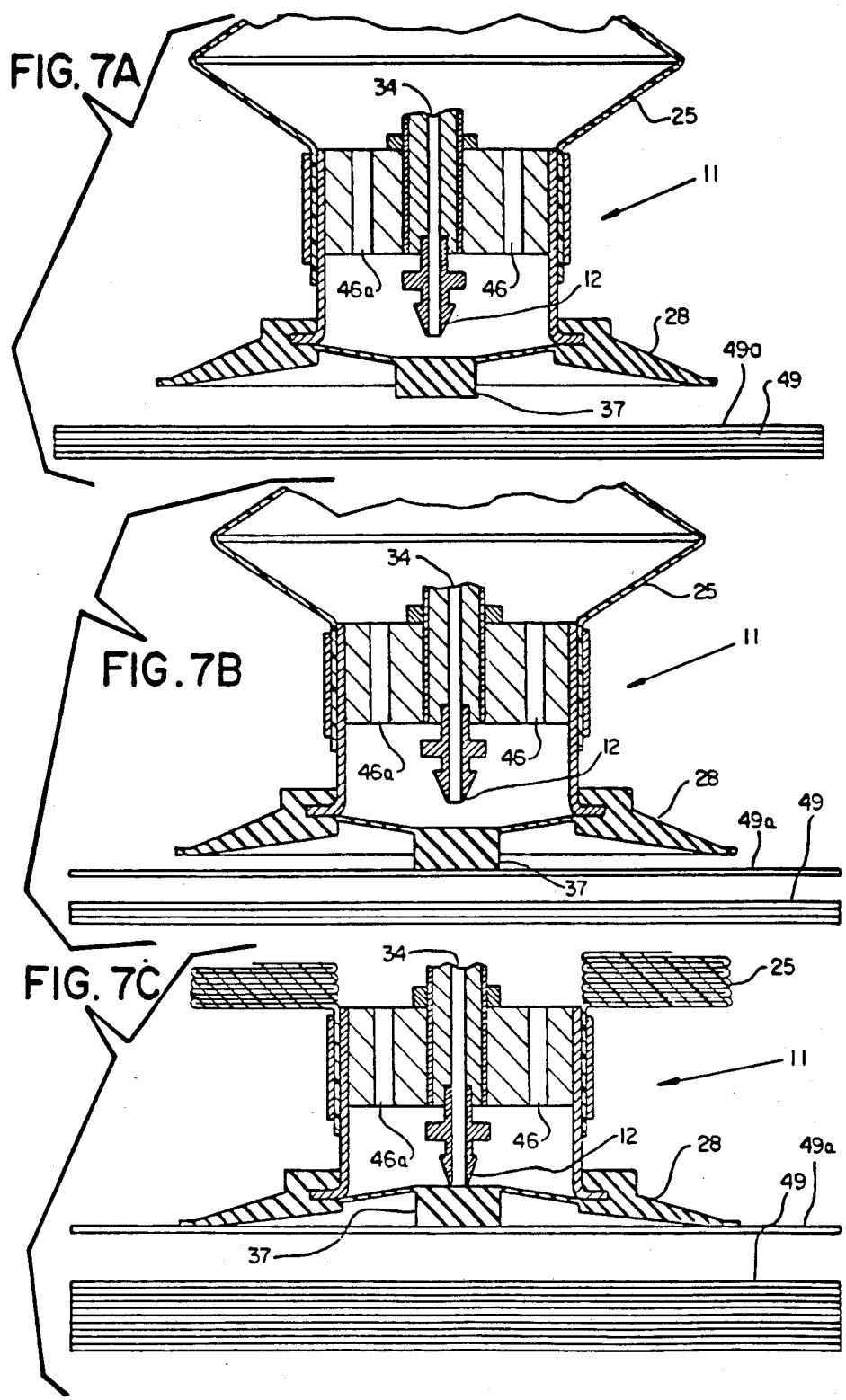

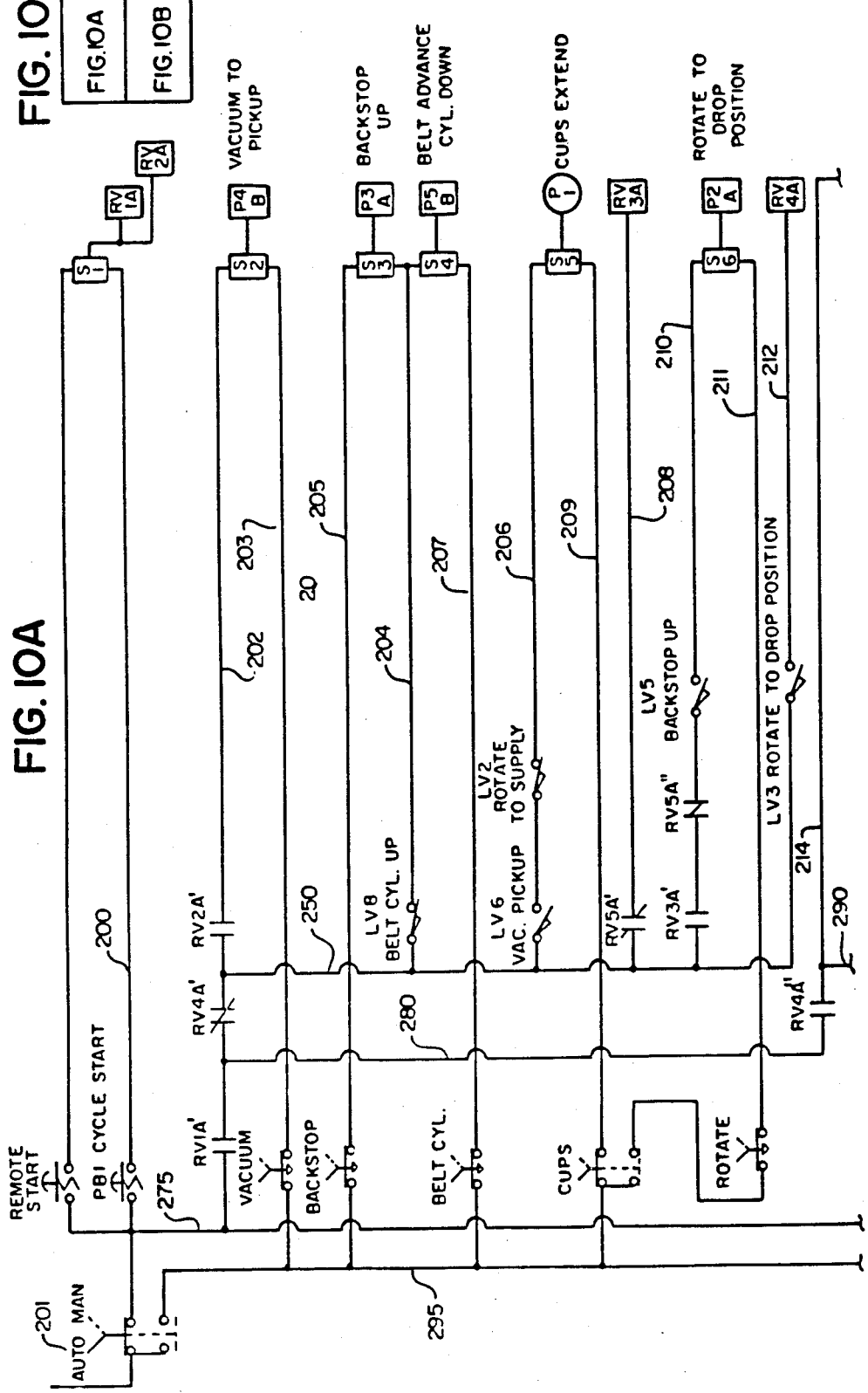

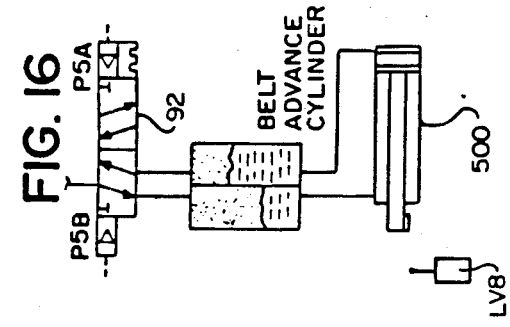
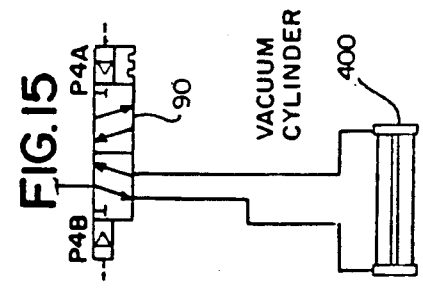
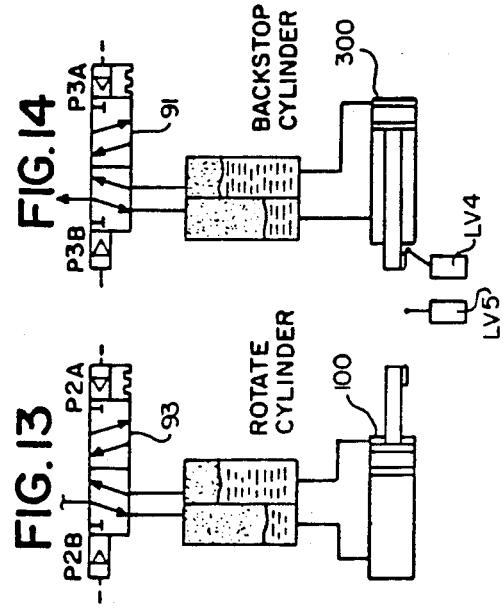
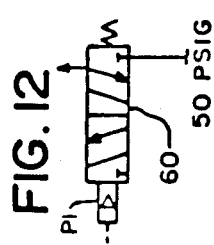
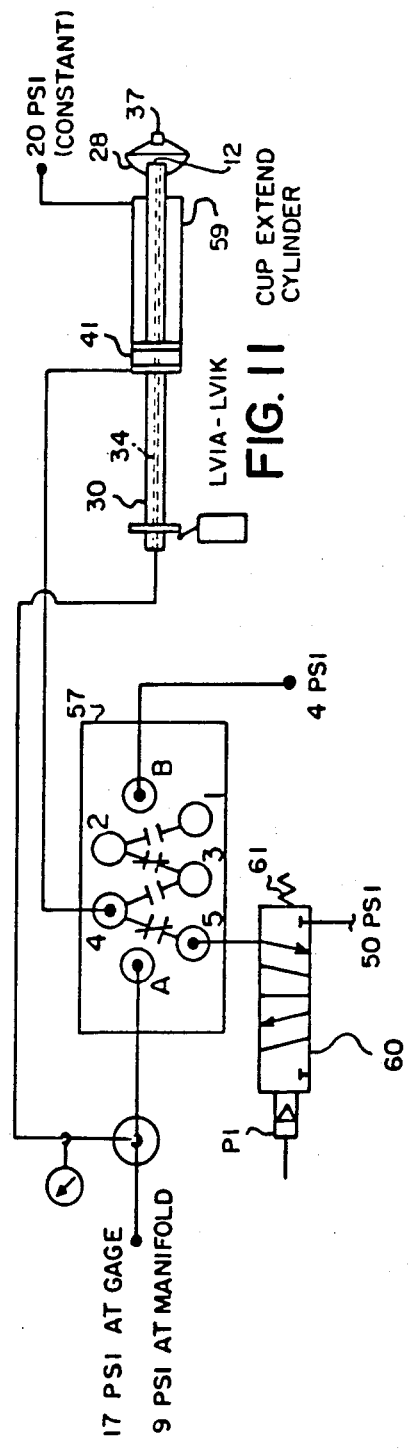

AUTOMATIC BATTERY STACKER

This is a divisional of application Ser. No. 680,782, now U.S. Pat. No. 4,728,093, filed Dec. 12, 1984, which is a divisional of application Ser. No. 390,806, filed June 22, 1982, now U.S. Pat. No. 4,534,549.

BACKGROUND OF THE INVENTION

1. Field of the Invention

The present invention pertains to the field of battery assembly, and in particular relates to the art of stacking battery plates and separators for use in such battery assembly.

2. Description Of The Prior Art

Prior art disclosures relating to automatic stacking equipment of battery plate and separator elements have been noted for their complexity, and may be demonstrated by teachings in patents U.S. Pat. Nos. 3,982,624 and 4,168,772. In prior art patent U.S. Pat. No. 4,168,772, for example, apparatus is disclosed that is characterized by such mechanical complexity in a form of escapement mechanisms, hold back devices, spring and retaining fingers, vibrators, separator and fluffing means, clamps, gates, advancing or stacking chains and knife means. A reason for the above mentioned complexity lies in a complicated arrangement for selecting a topmost plate or separator element from a chute containing a plurality of such elements. As the plates, for example, are located within the chutes in a downwardly facing orientation at each station in the prior art stacking machine, it is necessary that the leading plate in the chute be positioned at a certain fixed distance with respect to the vacuum pickup in order to achieve successful withdrawal therefrom. This is provided by use of a descending spring finger that is positioned above the chute. The spring finger freely engages the upper plate edges at a location where there are a plurality of plates between a discharge point at the end of the chute and the spring finger. The spring finger functions in a manner to urge the plates forward in the chute against the two retaining fingers.

After urging a plurality of plates toward the discharge point at the end of the chute and against the two retaining fingers, a knife edge is driven between the first and second plates in the chutes at the same time that a resilient member descends to engage their upper surfaces except for the first plate. Separating the first plate from the stack and engaging the remaining thereof with a resilient member enables the vacuum pickup to remove the lead plate without disturbing the other plates.

Other complexities of the prior art above-mentioned involve the use of vibrators to order to create within the chute a vibratory action whereby the separators are made to lie flat therein. This mechanical arrangement involves use of a plurality of eccentrics for creating the vibratory action within the chute so that it tends to shake down the separators evenly and therefore maintain their bottom edges in a flat orientation.

It will become readily apparent herein that the instant invention is characterized by relative simplicity in design and operation vis-a-vis the prior art above discussed. This simplicity in overall design characteristics results in economics of scale and overall improved system performance.

Furthermore, in view of the jet sensor utilized with each vacuum pickup of this invention, there is not requirement that a plate or separator be located at a fixed position with respect to the vacuum pickup as in the prior art. In the present invention therefore, the vacuum pickup selects a plate or separator wherever it may be located in a chute, rather than having the pickup position itself with respect to the element at a fixed location as in the prior art.

The air jet proximity detector of this invention permits simplified chute design for storing plates and separator elements in processing by the automatic stacker, since the elements can be stored therein with an upright orientation so that the elements can be freely removed therefrom. Hence, any need for vibratory action, spring and retaining fingers, knife separators and the like with respect to the chute is obviated.

It is therefore an object of the present invention to provide a novel apparatus and method for stacking battery plates and separator elements in the form of a sandwich that is relatively simple in design and operation.

Other objects and advantages of the present invention will be readily apparent to those skilled in the art from a reading of the detailed description of the preferred embodiment, and the appended claims, as well as elsewhere herein.

SUMMARY OF THE INVENTION

The invention provides an automatic stacker for use with battery plates and separator elements wherein proximity sensing vacuum pickups are utilized. The vacuum pickups, which may be extended or retracted, are angularly positioned in alignment with respective chutes, each of which contains either plates or separators arranged in a stack. In operation, the pickups are extended to a point in proximity to a topmost element of a respective stack where the plate or separator, as the case may be, is loaded thereon. As soon as the element is loaded onto the pickup, a coupled air jet sensor activates a control mechanism for retracting the pickup from its associated chute. After all of the pickups have been retracted, they are rotated to a vertical position where they are brought over and deposited onto a conveyor belt. The conveyor belt is thereafter advanced a short distance to a next work station under an adjacent pickup and the procedure is repeated. Accordingly, the vacuum pickups respectively deposit a plate or separator over the previously deposited plate or separator on the conveyor until a sandwich of alternately stacked plates and separators of sufficient number is formed.

BRIEF DESCRIPTION OF THE DRAWINGS

FIG. 3A is a view of the pickup in FIG. 3 shown in a fully extended position;

FIGS. 6A–6B are various views of a suction cup of this invention wherein:

FIG. 6A is a bottom perspective of the suction cup;

FIG. 6B is a bottom perspective of the suction cup including a cover arrangement;

FIG. 6C is a top planar view on FIG. 6A;

FIG. 6D is a sectional view taken on 6D—6D on FIG. 6C;

FIGS. 7A-7C are various views of the pickup operation of this invention wherein:

FIG. 7A is a partial view through one of the vacuum pickups showing the position of a suction cup as it approaches the battery separator or plate element;

FIG. 7B is a partial view through one on the vacuum pickups wherein the suction cup is shown with respect to the topmost battery element which is being lifted from a stack;

FIG. 7C is a partial view through one of the vacuum pickup wherein a button device suspended across the suction cup is shown blocking a positive pressure orifice during its retraction;

FIG. 8 is end view of a switching arrangement for moving a vacuum source from one vacuum manifold to an adjacent vacuum manifold;

FIG. 9 illustrates an end view of a rotating vacuum manifold including a finger device for actuating associated limit valves;

FIG. 10 is a schematic of air logic used with the automatic battery stacker of the invention wherein:

FIG. 10A is a portion of the air logic; and

FIG. 11 is a schematic of the jet sensing system utilized in this invention;

FIG. 12 is a schematic of a cup extend cylinder system;

FIG. 13 is a schematic of a rotate cylinder system;

FIG. 14 is a schematic of a backstop cylinder system;

FIG. 15 is a schematic of a vacuum cylinder system;

FIG. 16 is a schematic of a belt advance cylinder system.

DETAILED DESCRIPTION OF THE PREFERRED EMBODIMENT

Figure 1:
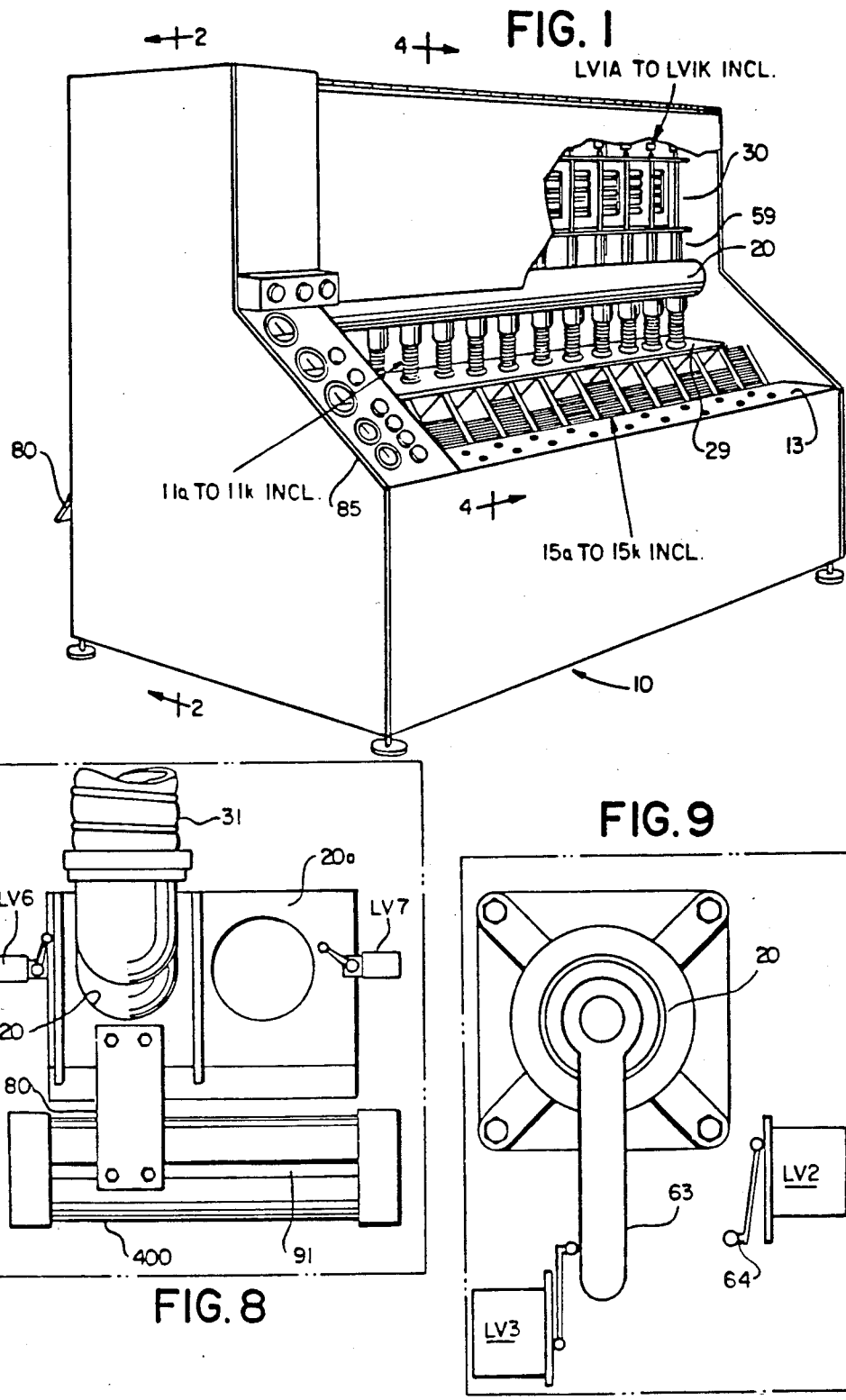
FIG. 1 is a perspective view of the stacker apparatus with a portion of the cabinet partially broken away to show its internal configuration.

Referring now to FIG. 1, there is shown a frontal arrangement of the battery stacker 10 of the present invention. Eleven vacuum pickups 11a-11k (hereinafter 11), are shown attached to a rotating vacuum manifold 20, and in an unenergized state are vertically oriented over a conveyor belt 29. A plurality of chutes 15a-15k (hereinafter 15) are provided for stacking and storing a plurality of battery plates and separators. With each respective pickup 11, there is associated a chute 15 containing either battery plates or separators. By way of example, pickup 11a is associated with chute 15a, which contains battery plates, whereas pickup 11b is associated with chute 15b, which contain battery separators. Therefore, the chutes 15a to 15k in general are alternately filled with plates and separators.

The chutes 15 are biased inwardly toward the conveyor belt 29 so that they are aligned with pickup 11 when the manifold 20 is rotated counterclockwise through an angle (as viewed from the left end of FIG. 1). In the preferred embodiment, the pickups 11 are rotated through an angle of thirty-five degrees with respect to their vertical orientation so that each is directly above its associated chute 15. The pickups 11 are oriented to an angular position over chutes 15 with respect to their vertical orientation when stacker 10 is in a condition to begin the stacking operation.

After the vacuum pickups 11 are rotated through the thirty-five degree angle, they are extended until each is in proximity to a battery plate or separator in an associated chute 15. When the pickups 11 are in proximity to the topmost plate or separator in each chute 15, it is captured thereby. The pickups 11 are thereafter retracted, after which they are rotated back to the vertical position. The vacuum in the manifold 20 is then cut off, thereby releasing the plate or separator element onto the conveyor belt 29. It should be noted that the pickups 11 to which the battery element is attached are retracted prior to rotating back to the vertical position in order to avoid contacting and possibly damaging the sides of the chutes 15.

The conveyor belt 29 is next indexed such that each deposited element is moved to a next adjacent work station directly over the next pickup 11 and chute 15. The process is repeated so that another battery plate or separator element is deposited on a previously deposited element until a desired level is achieved. The stacker 10 is designed so that it may be readily modified so that thickness of the sandwich may be varied in order to accommodate different size batteries. This feature will be described in a later paragraph.

The pickups 11 are retracted and extended by means of cup extend cylinders 59 in association with their respective piston rods 30. The piston rods 30 in combination with the cylinders 59 cause the pickups 11 to extend and retract as required during the stacking operation. When all of the pickups 11 are retracted, the piston rods 30 place respective two-way air valves LV1A-LV1K in a passing state; and when the pickups 11 are extended the piston rods 30 descend so as to place respective valves LV1A-LV1K in a non-passing state. The functioning of the valves LV1A-LV1K will be discussed in greater detail when explaining the overall system operation.

A work tray 13 is located directly in front of the chutes 15 for use by operators of the stacker 10. The tray 13 is made of perforated metal so that when vacuum emanating from manifold 20 is removed from the pickups 11, it will be switched to a second vacuum manifold (not shown in FIG. 1) for operation of stacker 10 in an environmental mode, and the vacuum will thereby be drawn through the tray 13. By drawing a vacuum through the tray 13, lead dust that may be generated by movement of the lead plates in the chutes 15 is quickly drawn away in order to protect the health and safety of nearby operators. An opening 80 in the rear of stacker 10 is provided for enabling lead particles, which are too heavy to be collected by vacuum, to be picked up manually.

The left-hand front panel 85 of the stacker 10 is utilized for various gauges and meters so that operators can monitor and control the operation of the stacker 10. Various operating switches and dials are also easily accessible for starting and stopping various operations in the stacker.

Figure 2:
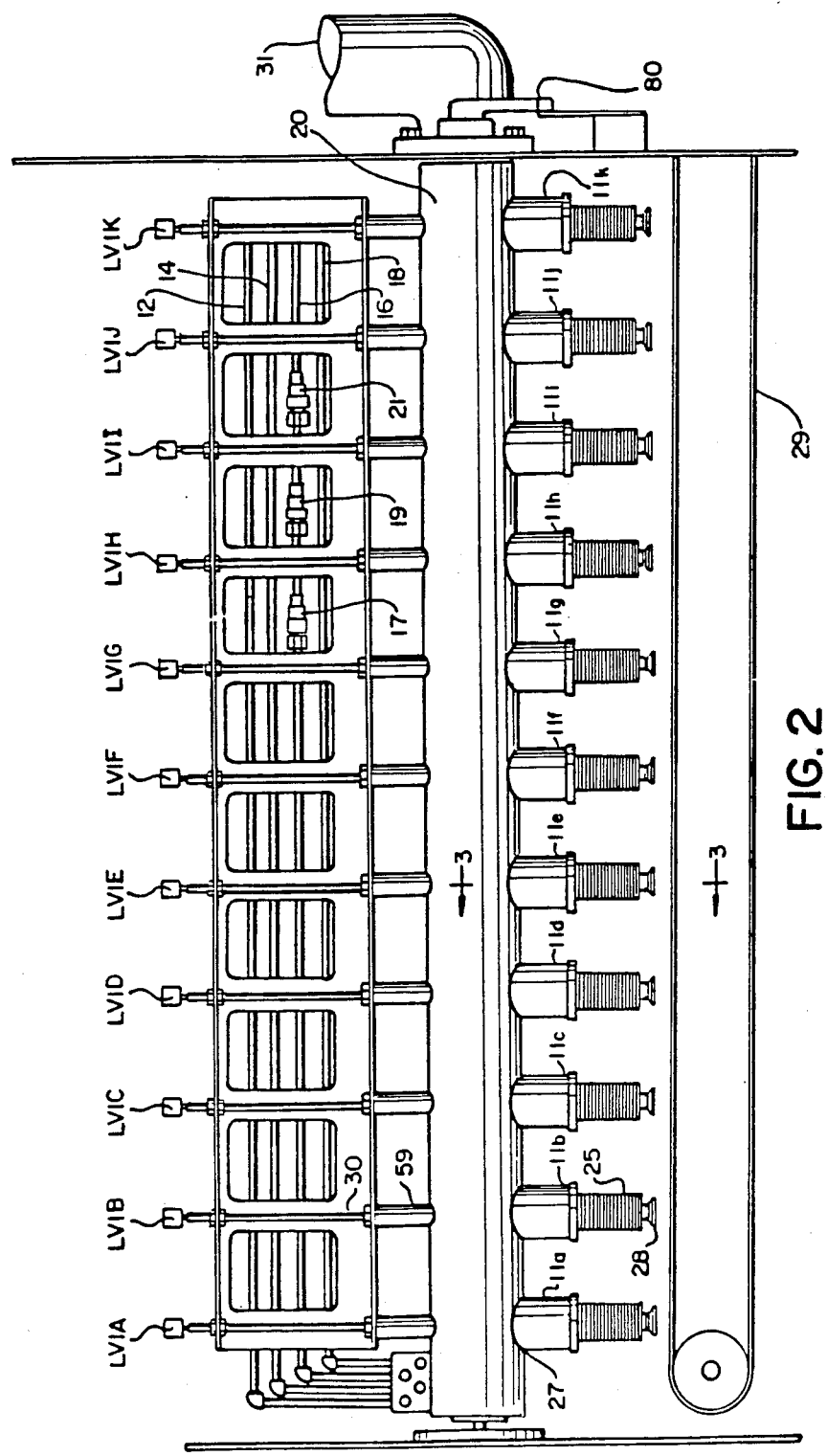
FIG. 2 is a partial section on line 2—2 of FIG. 1.

Referring now to FIG. 2, which is a front elevation of the stacking machine 10 of this invention, there is depicted eleven vacuum pickup devices 11a-11k located in parallel on and extending from the rotating vacuum manifold 20 over the conveyor belt 29. The vacuum pickups 11 are joined to the vacuum manifold 20 via couplings 27 and expandable bellows 25. The respective pickup devices 11 terminate at their lowest extremity in suction cups 28, through which a vacuum is drawn via their connection with the vacuum manifold 20. The pickups 11 are shown in a retracted position and directly over the conveyor belt 29, which is tilted downwardly when viewed from left to right. The conveyor 29 is tilted to accommodate formation of the sandwich as it is formed one element at a time at each pickup station under each vacuum pickup 11 starting from the extreme left pickup 11a and ending at the extreme right pickup 11k. By the time the conveyor 29 is indexed past each station under a respective pickup 11, a complete sandwich of alternating plates and separators is formed. The conveyor 29 is therefore sloped to accomodate the increased stack height as the stack moves from left to right in FIG. 2.

Extending out of an opposite side of the rotating manifold 20 are cup extend cylinders 59, which project through the rotating manifold 20 and coupling 27. A moveable piston rod 30 is connected to a piston (not shown) within the cylinder 59 for upward and downward movement in accordance with various operational conditions of the stacker 10. End points of the cylinder rods 30 are located in juxtaposition to two-way air limit valves LV1A-LV1K. As previously mentioned, when the pickup devices 11 are in their retracted position as shown, the cylinder rods 30 extend fully upward so that their respective ends make contact with valves LV1A-LV1K to place these valves in a passing state (i.e., pass pressurized air). On the other hand, when the respective ends of the cylinder rods 30 do not make contact with the limit valves LV1A-LV1K, the pickup devices 11 are extended in a downward direction or are being extended, so that the limit valves are no longer in a passing state.

Four different positive air pressures are utilized for various purposes and functions in the stacking machine 10 in addition to the negative pressure which is utilized for pickup purposes. The different positive pressures in pounder per square inch (PSI) that are used throughout the operation of stacker 10 are 4, 9, 20 and 50. These four pressures are distributed throughout the system in pipes 12, 14, 16 and 18. In the operation of the stacker apparatus 10, it may be required that the sandwich-like arrangement of lead plates and separators arranged in an alternating fashion be composed of a number of elements less than eleven (that is, less than the total number of pickup elements 11 shown) in order to accommodate a particular battery being manufactured. This accommodation may be satisfied by means of two position, three-way slide valves 17, 19 and 21 located in the line 16 carrying the 50 PSI air. The slide valves which are made by Detrol Corp., have an ON or OFF with exhaust position for use in line 16. If a 7-layer battery sandwich, for example, is required for manufacture instead of an 11-layer sandwich, the valve 17, which is located after pickup 11g, is placed in the OFF with exhaust position so that 50 PSI air will not pass to pickups 11k and hence, pickups 11h to 11k cannot be extended downwardly in the operation of automatic stacker 10. It shall be understood, that the invention can also accomodate an enveloped plate system wherein positive plates are enveloped and negative plates are not so enveloped, without departing from the spirit of the invention.

Referring now to an extreme right of the battery stacker 10 of FIG. 2, a vacuum source 31 produced by an appropriate vacuum pump (not shown) is connected to the rotating vacuum manifold 20. In a preferred embodiment, the vacuum pump produces twenty water column inches when all cups 28 are open, and twenty-five water column inches when the cups 28 are loaded. A slidable coupling arrangement 80 connected to vacuum cylinder 400 (FIG. 8) allows for switching the vacuum source 31 to an adjacent vacuum manifold 20a so that the stacker 10 may operate in either the environmental or the pick-up modes, as may be appropriate during the operation of the stacker.

Figure 3:
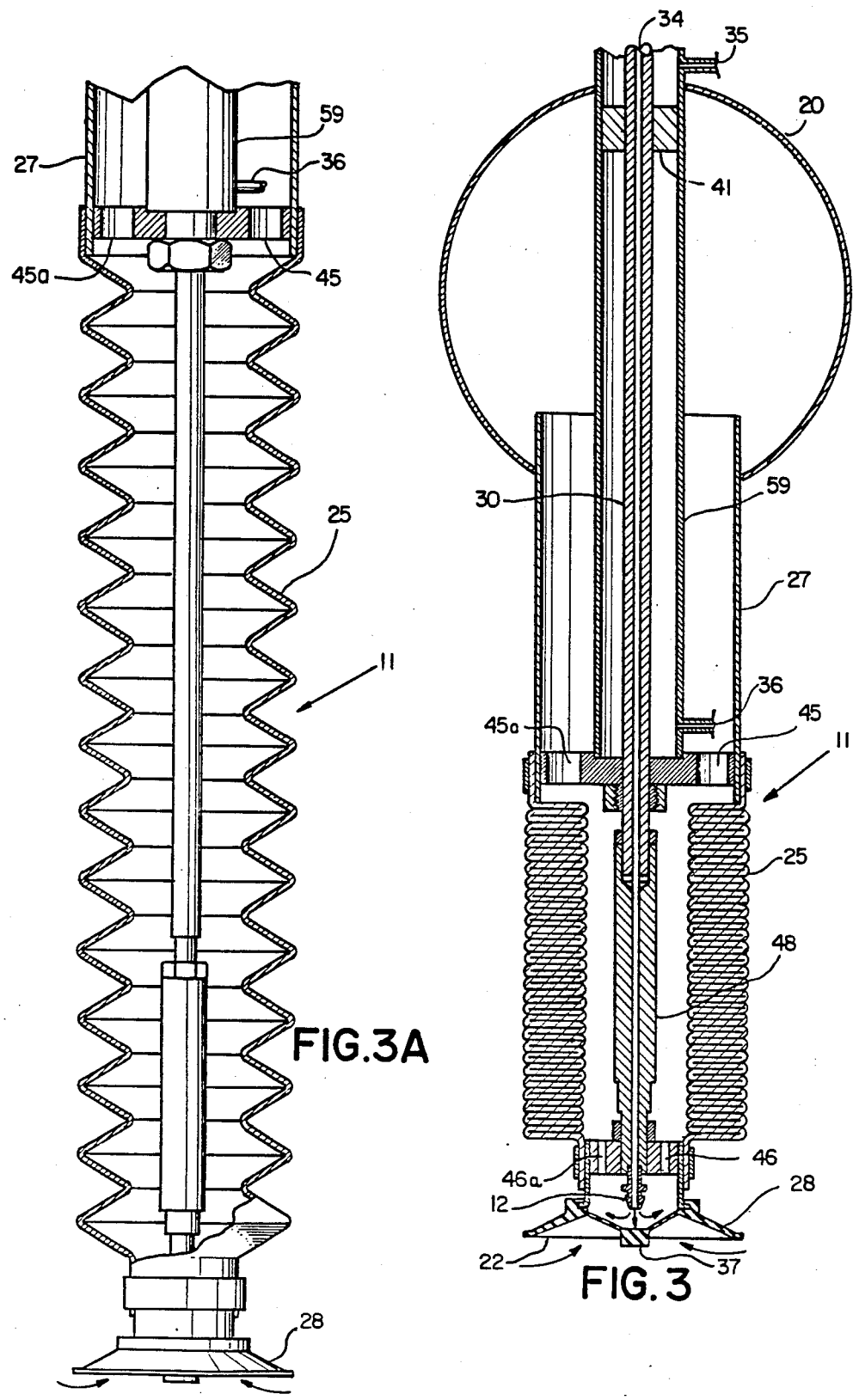
FIG. 3 is a vertical section through line 3—3 of a vacuum pickup shown in a retracted position on FIG. 2.

Reference is now made to the sectional view FIG. 3 wherein there is depicted an internal structural arrangement of the vacuum pickup device 11. The vacuum pickup device 11 is shown in the retracted position as indicated by tight coupling of the bellows 25. As previously mentioned, the vacuum manifold 20 is connected to the suction cup 28 via the coupling 27 and the bellows 25. Located within the vacuum manifold 20 and coupling 27 is the suction cup extend cylinder 59. Vacuum is pulled from the manifold 20, through the suction cup 28, via orifices 46, 46a formed through an attaching plate, interior of bellows 25, orifices 45, 45a formed through a second attaching plate and interior of coupling 27.

A partial view of the cup extend cylinder 59 in FIG. 3 shows this device partly surrounded by coupling 27 and vacuum manifold 20. A piston rod 30 associated with an internal piston 41 is located within the cylinder 59 for movement upwardly and downward therein in accordance with a differential air pressure which is established on the piston 41. Thus, inlets 35, 36 are provided on either side of piston 41 for permitting entrance of air pressure at 50 and 20 PSI, respectively, for raising and lowering piston rod 30 as well as suction cup 28 as required during the operation of stacker 10 (FIG. 1).

In operation of the cylinder 59, the 20 PSI supply (not shown) attached to inlet 36 is always applied thereto on one side of piston 41, whereas the 50 PSI supply (not shown) is only applied during the extension of the piston rod 30 in a downward direction as depicted in FIG. 3A where the bellows 25 is shown in an extended position. Thus, when the 20 PSI alone is applied via inlet 36 to one side of piston 41, it exerts an upward force thereon thereby placing pickup 11 to its retracted position. On the other hand, if it is required to extend suction cup 28 downwardly during operation of stacker 10, the 50 PSI is applied to inlet 35 at the same time that the 20 PSI supply is applied, thereby establishing a differential pressure of 30 PSI downwardly upon piston 41. The differential pressure causes piston 41 as well as piston rod 30 to move in a downward direction. In the preferred embodiment of this invention, the piston rod 30 and therefore suction cup 28 have a downward travel of approximately ten inches.

A 9 PSI air supply is also provided, as above mentioned, in the operation of the vacuum pickup 11. The 9 PSI air supply passes through a central opening or channel 34 formed in the piston rod 30, and its extension rod 48 where it eventually is expelled at orifice 12. The pressure at orifice 12 drops to approximately 2 PSI. The 9 PSI air supply being expelled at orifice 12 impinges upon button 37 of suction cup 28, thereby positioning the button below a plane 22 formed in the lowest position of the cup. The arrows emanating from orifice 12 indicate air being expelled therefrom due to the application of the 9 PSI supply. Arrows having an upward direction indicate that the vacuum is being exerted on suction cup 28 via manifold 20 simultaneously with the expelling of positive pressure from orifice 12. The 9 PSI air supply is utilized in the controlled pickup arrangement of this invention as will be explained in a later paragraph.

Referring now to the view of FIG. 6A, there is depicted the suction cup 28 from which the button 37 is suspended by two oppositely placed web members 39.

The exterior of cup 28 is shaped so that its lower portion 40 forms a truncated cone that merges into an upper portion 41 (FIG. 6D) in a form of a cylinder. A lower extremity of the suction cup 28 terminates in a form of a flat lip 42 for easy attachment to a battery element during the stacking step. The button 37 is shown suspended below the imaginary plane 22 formed through the flat lip 42. It can be appreciated by referring to FIG. 6C that openings are provided on either side of the webs 39 so that both the air emanating from the 9 PSI supply being expelled from orifice 12 (FIG. 3), and vacuum can be pulled simultaneously from the area under the suction cup 28.

FIG. 6B illustrates an expedient whereby a suction cup 28 can be blocked by a cover 38 when not in use during operation of the automatic stacker 10. Thus, as is understood, it may be necessary to build a 7-layer instead of a 11-layer battery element sandwich, so that only pickups 11a to 11g are to become operative. However, since vacuum is being drawn through all of the pickups 11 via the manifold 20 (FIG. 2) irrespective of the number of pickups that are employed, the cover 38 is utilized to block the vacuum in pickups 11h to 11k in the above illustrative example. The blockage of the vacuum in the unused pickups 11h to 11k by cover 38 provides noise abatement in the vicinity of the automatic stacker 10. Cover 38, which is made of a flexible vinyl material, fits snugly over lip 42 (FIG. 6A) of cup 28 when positioned in place.

Figure 4:
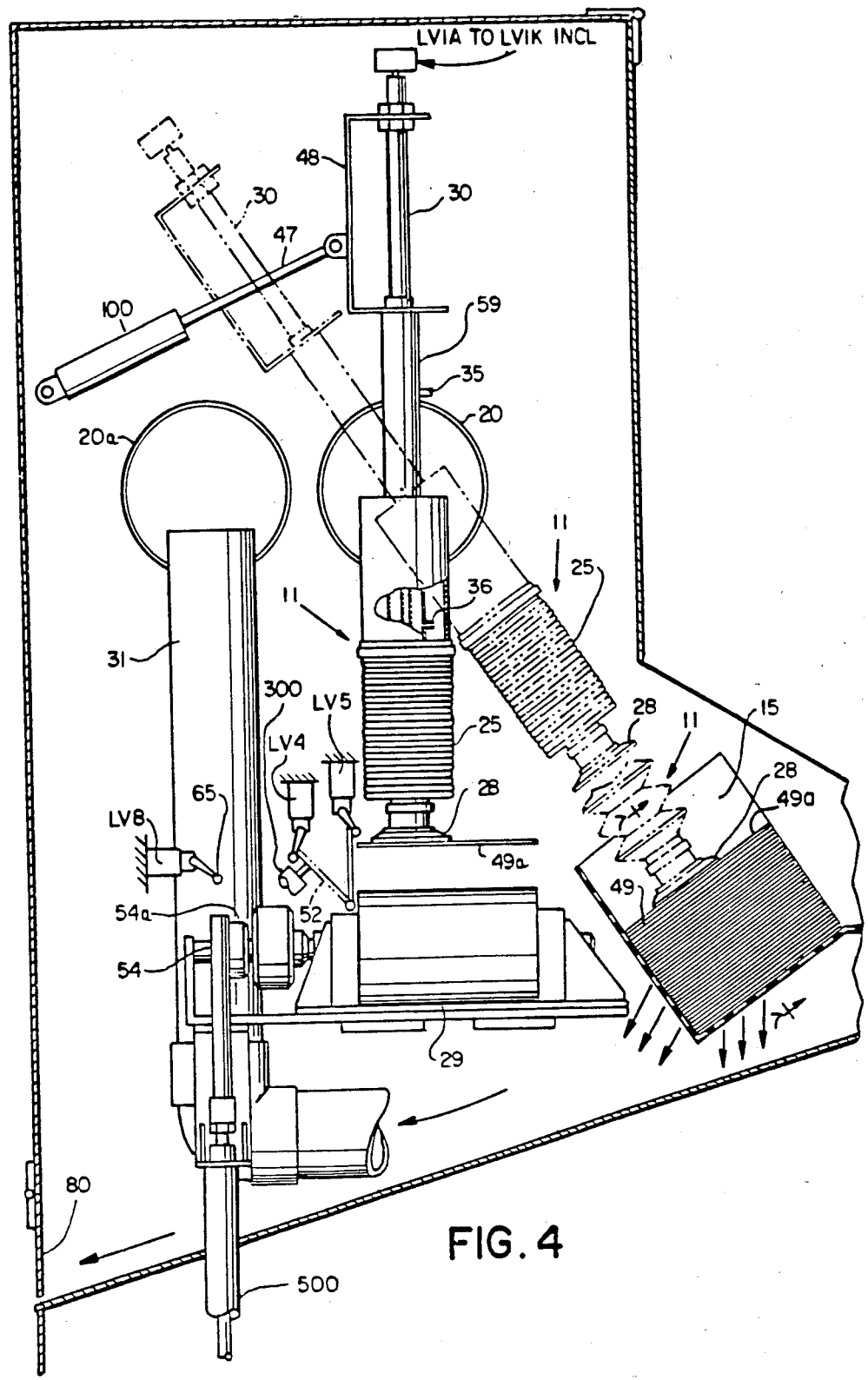
FIG. 4 is a vertical sectional view through line 4—4 on FIG. 1.

Reference is now made to FIG. 4 wherein the pickup operation of the present invention is disclosed. In the normal non-operating state of the stacker 10, the vacuum pickups 11 are in a vertical alignment directly over the conveyor belt 29 as shown in FIGS. 1, 2 with suction cup 28 fully retracted. However, when the stacker 10 is in the pickup mode, the pickup 11 is quiescently orientated at an angle of 35 degrees (shown in phantom) with respect to a vertical axis through an imaginary center of manifold 20 wherein the suction cup 28 is facing directly at a topmost plate 49a of a plurality of stacked plates 49 located with the chute or bin 15. In the quiescent state, the bellows 25 of pickup 11 is shown as being tightly coupled as the suction cup 28 faces the chute 15.

The pickup 25 is rotated to the 35 degree position by means of a rotate cylinder 100, which is attached to bracket 48 by means of piston rod 47 extending from the cylinder. When the piston rod 47 is in a fully extended position, pickup 11 assumes the vertical orientation, whereas to locate pickup 11 in the 35 degree position over the chute 15 the rotate cylinder 100 causes the rod 47 to retract (not shown). It should be noted here that the limit valves (LV1A-LV1K, see FIG. 1) are located upon the bracket 48 and rotate when pickups 11 and manifold 20 rotate.

When the stacker 10 (FIG. 1) is switched to the pickup mode from the environmental mode, vacuum, which is present in manifold 20a, for picking up lead dust through pipe 31, is transferred to vacuum manifold 20 so that a vacuum is now pulled through suction cup 28. Simultaneously with vacuum being applied to suction cup 28, a positive pressure of 9 PSI is applied through the center of pickup 11 as previously discussed with respect to FIG. 3. Before the bellows 25 is extended from its quiescent tightly coupled arrangment above bin 15, a backstop 52 is moved from a 45° position (shown in dotted form) to a vertical position by means of a backstop cylinder 300 (partly shown).

A rack 54 and pinion or worm gear 54a (FIG. 5) is shown coupled to an axle 55 of a roller 56 of the conveyor belt 29. The rack 54 and pinion 54a are shown in a retracted position in FIG. 4 so that it is in a position to index or advance the conveyor belt 29 to a next station under pickup 11b after a battery plate or separator 49a is deposited thereon by pickup 11a. In other words, by moving the rack 54 in an upward direction by activation of belt advance cylinder 500, the pinion 54a will rotate clockwise (as viewed from the right of FIG. 5) causing roller 56 to rotate clockwise, and conveyor 29 will move to the right.

Returning again to FIG. 4, when the pickup 11 is extended in order to select the topmost plate or separator 49a, the bellows 25, which was previously retracted, extends as shown in dotted form toward chute 15 by application of the 50 PSI to inlet 35 of cup extend cylinder 59 as previously described. This operation may be more readily appreciated and understood by referring to FIG. 7A where the pickup 11 is shown as its suction cup 28 approaches the plurality of battery elements 49. It will be recalled that during the pickup operation, a positive air pressure of 9 PSI is being applied through orifice 12 which is vented upon button 37 of suction cup 28. Simultaneously, vacuum is being drawn through the suction cup 28 via openings 46, 46a, openings 45, 45a (see FIG. 3) and vacuum manifold 20.

As the pickup 11 is moved in proximity to the stack of elements 49 as shown in FIG. 7A, a Bernoulli effect is created by movement of air over the upper surface of the topmost element 49a of stack 49 due to the vacuum pull. As a consequence of the Bernoulli effect, the pressure above the topmost member 49a is reduced. Accordingly, when the suction cup 28 is at the proper distance, the topmost member 49a moves upwardly off at the top of the stack 49 toward suction cup 28 as shown in FIG. 7B. The movement of the topmost member 49a upwardly enables the vacuum to exert a greater force thereon, so that as a result the member 49a is drawn firmly against the underside of suction cup 28 and is effectively captured thereby. The attachment of top member 49a by suction cup 28 causes the button 37 to also move upwardly so that the orifice 12 becomes blocked preventing further air from the 9 PSI supply to be expelled through orifice 12. The blockage of channel 34 by button 37 causes a back pressure to be established in channel 34 which produces a signal with respect to a control device (not shown) that enables the pickup 11 to immediately retract from its fully extended position as shown in FIG. 4. However, in this phase of the cycle, the topmost element 49a is attached by vacuum to suction cup 28. In essence, the control device, as will be further discussed, causes the 50 PSI applied to one side of cylinder piston 22 (FIG. 4) to dissipate itself so that the piston will move upwardly and the bellows 25 will collapse into a tightly coupled configuration. Accordingly, the pickups 11 is able to capture the topmost element 49a of a stack 49 of elements irrespective of the height of the stack by merely coming in proximity therewith. It should be understood that only one pickup 11 has been described for ease of understanding, however, each pickup 11a to 11k (FIGS. 1, 2) will operate in the same manner with the identical associated structure as above described.

Figure 5:
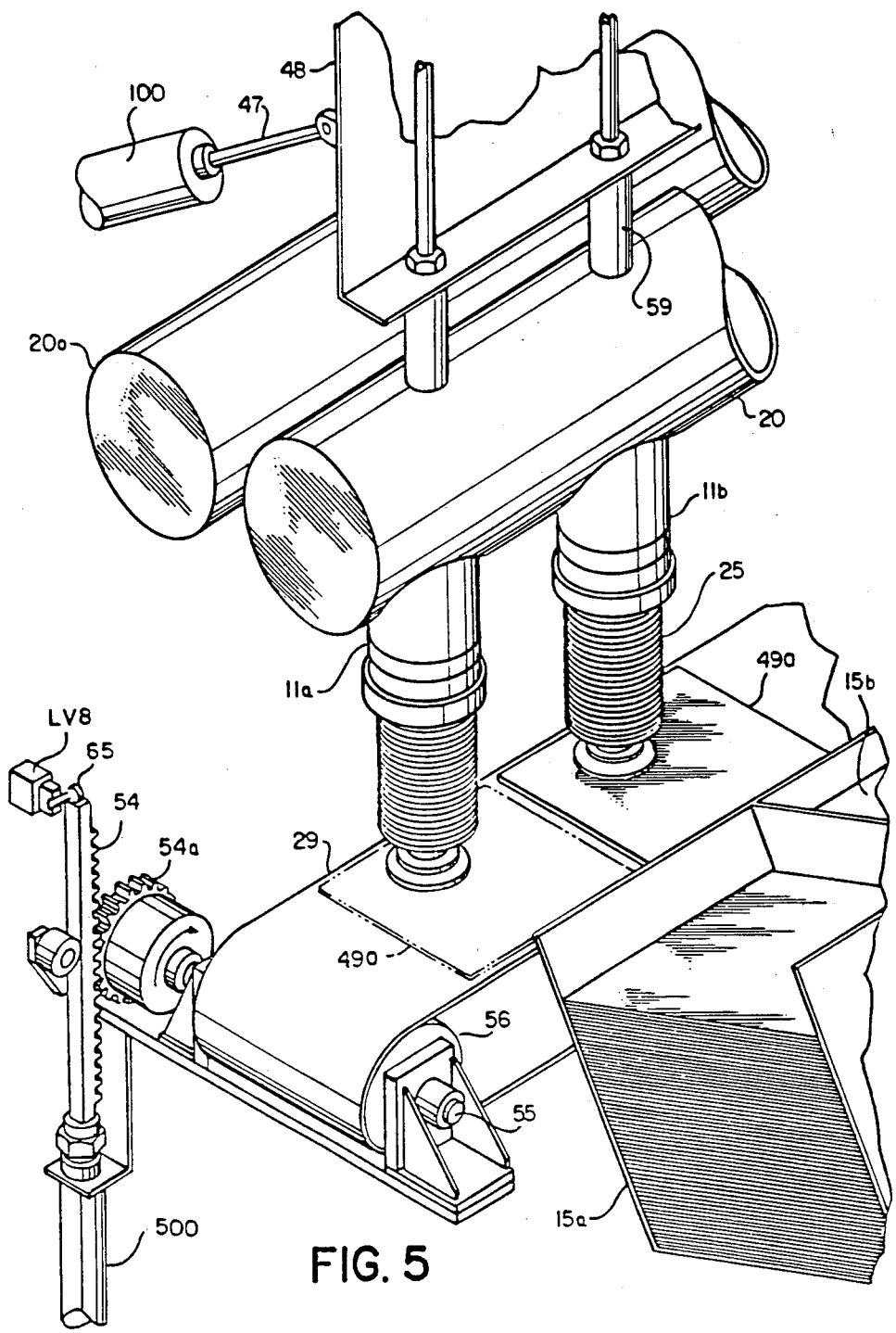
FIG. 5 is an isometric view of FIG. 4 showing placement by pickups of battery elements on the conveyor.

The pickup 11 including the topmost element 49a are thereafter rotated to the vertical direction as in FIGS. 4 and 5. When the pickups 11 is in the vertical orientation, the vacuum is removed from manifold 20 and from the suction cup 28 and the element 49a is thereby deposited upon conveyor belt 29. When the pickup 11 is over the conveyor belt 29, it is only inches therefrom. The backstop 52 (FIG. 4) which is now in the vertical direction, aids in alignment of the element 49a by preventing its sidewise movement over the side of conveyor 29 created by inertia from the rotational movement of pickup 11.

Referring to FIG. 11, there is shown a schematic representation of the air jet sensing control system as provided by the present invention. The control valve 57, which is a pneumatic free floating relay made by Numatrol, a division of Numatics, Inc., utilizes two ports A, B wherein port A has applied thereto the 9 PSI (17 PSIG) air pressure, whereas port B is connected to a constantly applied 4 PSI (4 PSIG) air supply. The 9 PSI supply is also applied to channel 34 of piston rod 30 and is expelled upon button 37 of suction cup 28 at orifice 12. The 20 PSI air source is applied constant to one side of piston 41 of cylinder 22, whereas its other side is connected to the 50 PSI air source through control valve 57.

When orifice 12 of channel 34 is not blocked by button 37 of suction cup 28, port A of relay 57 is pressurized below the constantly applied 4 PSI supply at port B. Therefore, under these conditions, port B is in control, which causes circuit path 5-4 to be passing (as indicated by crossed contacts), whereas circuit path 3-4 is non-passing (as indicated by open contact). In other words, when the pressure at post B is higher than that of port A, terminals 4-5 are in a passing state, whereas terminals 3-4 are in a non-passing state.

Connected to terminal 5 of relay 57 is a power valve 60, which is designed to allow passage of 50 PSI under proper conditioning thereto. As shown in the drawing, power valve 60 is in a non-passing state with respect to the 50 PSI supply source because the arrow directly opposite its input is in a blocking state (as indicated by a downwardly pointed arrow). For power valve 60 to become passing with respect to the 50 PSI air source, pilot port P1 must be shifted by an application of pressurizing air thereto. When the pressurizing air is removed from pilot port P1, the valve 60 is returned to its non-passing state by a return spring 61.

In order for the suction cup 28 to extend toward a topmost member 49a of a stack 49, a air pressure is applied to the pilot port P1 of the power valve 60, thereby causing a spool within the valve 60 to shift so that a flow path is established therein between the 50 PSI source to terminal 5 of the control relay 57. In other words, the power valve 60 has been shifted so that the direction of the arrows is switched, and therefore the right-hand arrow is shifted to point upwardly. The switching of the right arrow indicates passage of 50 PSI supply to terminal 5 of relay 57.

Since circuit 5-4 is also in a passing state under influence of the 4 PSI control signal at terminal B (terminal A is pressurized below that at B) the 50 PSI air supply is applied from terminal 4 of relay 57 to the other side of piston 41 of cup extended cylinder 59. As previously discussed, a differential pressure of 30 PSI is established downwardly on piston 41 so that the piston rod 30 as well as suction cup 28 extends downward (or to the right as viewed in FIG. 11) to the chute 50 as shown in dotted form in FIG. 4.

In order to retract the piston rod 30 and suction cup 28 to the position shown in FIG. 11, the button 37 blocks orifice 12 (FIG. 7C) as the topmost member 49a is captured in the matter previously discussed. A back pressure is established in channel 34 by the blockage of orifice 12, which causes the pressure at port A of relay 57 to be higher than the 4 PSI supply at port B. Since port A is now in control, circuit path 5-4 changes and becomes non-passing, whereas circuit path 4-3 now becomes passing. This action enables the 50 PSI acting on one side of piston 41 to dissipate into the atmosphere through circuit 4-3 and the constantly applied 20 PSI air supply acting alone on the other side of the piston 41 causes it and suction cup 28 to retract.

When the 50 PSI supply is removed from one side of piston 41, the spool valve of power valve 60 is returned to its non-energized state by removing the air pressure from pilot port P1 of power valve 60. Since power valve 60 has a spring return as indicated by spring 61, the valve 57 returns to its normal state so that the 50 PSI supply can no longer pass to terminal 5. This is indicated schematically by the downward orientation of the arrow in the right position of power valve 60. When the piston rod 30 is retracted, it makes switches LV1A–LV1K (see FIG. 1), so that the pickup 11 is ready to rotate 35° to the vertical direction (FIG. 5) in order to deposit the separator or plate 11, as the case may be, on the conveyor belt 29.

Referring briefly to FIG. 5, after the topmost member 49a was deposited on conveyor belt 29, the rack 53 is extended from its former retracted position to rotate the pinion 54 in a clockwise manner as is directed by the arrow to rotate roller 56 clockwise and advance the conveyor 29 rightwardly as viewed in the drawing. Hence, by indexing the conveyor belt 29, the topmost element 49a (shown in phantom) is transferred from under pickup 11a to an adjacent work station (i.e. under pickup 11b). It will also be understood by those skilled in the art that if the members in chute 15a are battery plates, the members in an adjacent chute 15b will be separators. In this manner, a sandwich is formed comprising alternating plates and separators. Thus, assuming that element 49a is a battery plate, it is now at a work station under pickup 11b. When the above described cycle of operation is repeated, a battery separator from chute 15b is deposited upon plate 49a. As conveyor belt is indexed to each station, the cycle is repeated until a sandwich of alternating layers is obtained.

Figure 10B:
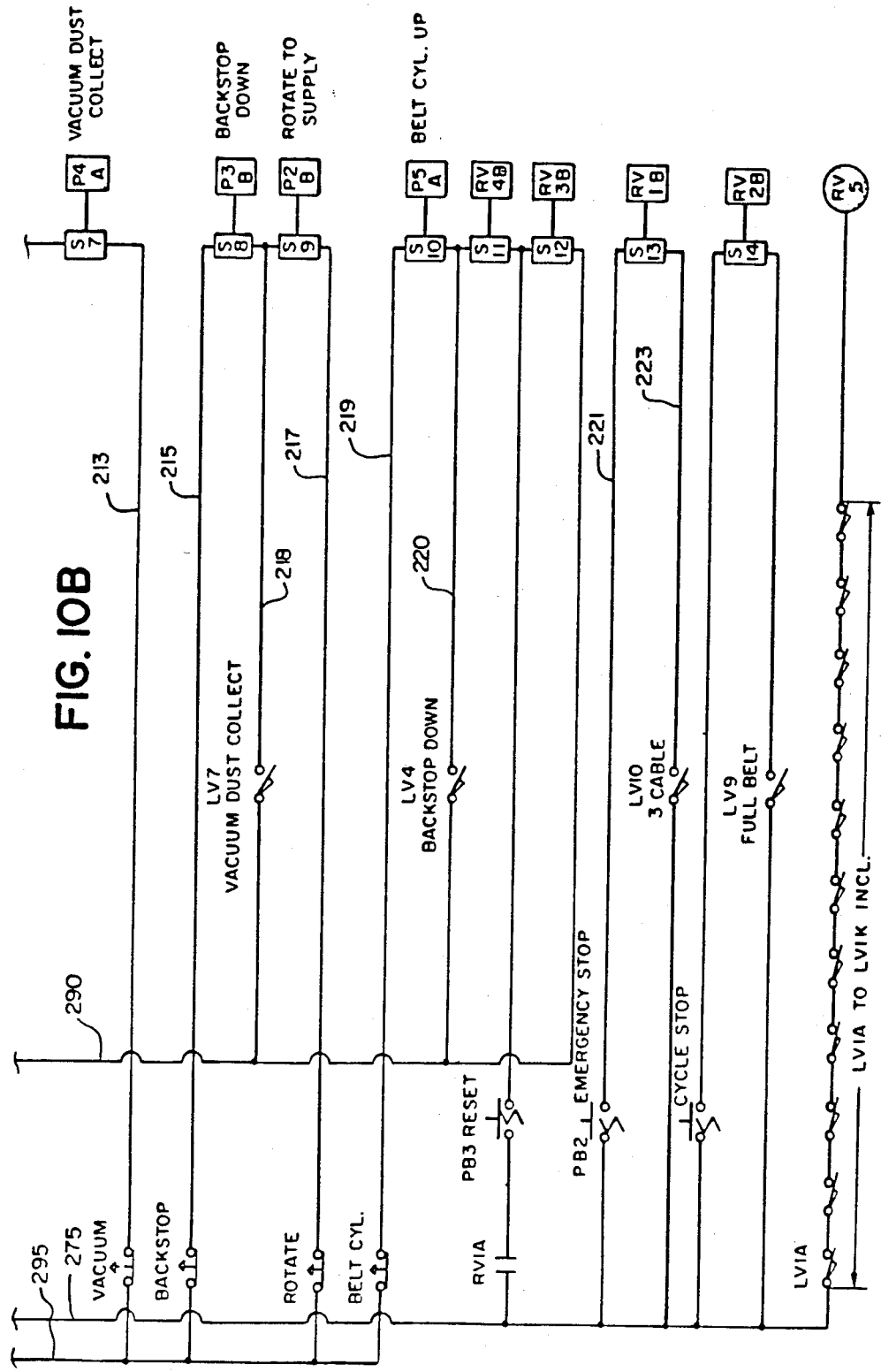
FIG. 10B is a remaining portion thereof.

Reference is now made to FIGS. 10A and 10B where air logic is shown for use in the operation of the automatic stacker 10. For purposes of explanation, the following initial conditions are present in the logic. The pickups 11 are retracted (FIG. 4) over the chute 15 and the two-way valves LV1A to LV1K associated therewith are made or in a passing state, that is, pressurized air is allowed to pass therethrough. The pipe 31 (FIG. 8) is in a position where vacuum is on the dust collector 20a (i.e. in the environmental mode), and the two-way valve LV7 is made or in a passing state. The vacuum pipe 31 in FIG. 8 is shown over manifold 20 where limit valve LV6 is made for use by the stacker in the pickup mode. The rotate manifold cylinder 100 (FIG. 4) is retracted in order to rotate the pickup 11 to the 35° position as above mentioned, and valve LV2 (FIG. 9) is made by action of finger 63 against actuator 64. Also the backstop cylinder 300 (FIG. 4) is retracted (i.e. at a 45° angle with respect to the conveyor belt) and two-way valve LV4 is made or passing. In addition, the belt advance cylinder 500 as shown in FIGS. 4, 5 and the indexing mechanism are extended (i.e. the rack 54 is in an "up" position) and the two-way valve LV8 is made through contact between activator 65 and a top of rack 54. Finally, the vacuum blower (not shown) is operating, and the battery elements 49 are loaded into chutes 15a–15k and the stacker 10 is ready to cycle.

When the operator depresses a cycle start button PB1 with automatic/manual switch 201 in the automatic mode position, air from a pressurized air supply (not shown) will pass through the automatic switch 201, the start button PB1 and then onto line 200 to the two-way shuttle valve S1. Shuttle valves S1 to S14 are valves that are used in the well known OR logic mode. The operation during the manual mode will be discussed in a later paragraph. When the shuttle valve S1 is activated, pilot ports RV1A and RV2A also become pressurized. Pilot ports RV1A and RV2A shift a spool mechanism within associated relay valves to change an air flow path within a circuit. Thus, by the pressurizing of the pilot ports RV1A and RV2A, respective flow paths RV1A as well as RV2A' in line 202 becomes passing. Since flow path RV4A' is already in a passing state because it is initially in that state when pilot port RV4A (line 212) is not energized due to limit valve LV3 having been released initially by retraction of the rotate cylinder 100, as above mentioned, pressurized air will pass through shuttle valve S2 via line 202. Pressurized air is also present on lines 250 and 280 because of the above-described valving action. By passing air through the shuttle valve S2, the pilot port P4B (FIG. 15) of power valve 90 will be shifted so cause the vacuum cylinder 400 (FIG. 8) to shift the vacuum hose 31 to pickup manifold 20 from that of the dust collector manifold 20a, where it was positioned during the initial conditions. In a preferred embodiment, vacuum cylinder 400 is a rodless cylinder made by Orega, however, it should be understood that a rod-type cylinder could be substituted therefor. In other words, vacuum has been shifted from its environmental mode to the pickup mode. This movement by the vacuum cylinder 400 causes the two-way valve LV6 to become passing or made (i.e. LV6 was initially made non-passing). The movement of hose 31 from manifold 20 to manifold 20a and vice versa, is accomplished by activating cylinder 400, which causes plate 80 attached to movable strip 91 of power cylinder P4 (FIG. 8) to move from right to left, or left to right, as the case may be.

Since the two-way valve LV8 is made or in a passing state during the initial conditions of the operation of the battery stacker (LV8 was closed by the rack 54 being fully extended) air passes from line 250 to line 204, through both shuttle valves S3 and S4 and thereby shifting the pilot ports P3A and P5B of power valves 91, 92 (FIGS. 14, 16), respectively. By shifting the pilot port P3A, the backstop cylinder 300 (FIGS. 4, 14) extends its piston rod upwardly thereby causing the backstop 52 to move from a 45 degree angle with respect to the conveyor 29 to a fully upright position; and by shifting the pilot port P5B the belt advance cylinder 500 is activated to cause the rack 54 to retract downwardly in order to get into a position where it can be ready to index or move the conveyor belt 29 later in the cycle. This movement by the rack 54 causes valve LV8 to release or become non-passing (i.e. as shown in FIG. 4), but this action has no effect on pilot ports P3A and P5B of backstop and belt advance cylinders 300, 500, since these ports are detented (as indicated by the sawtooth configuration under the port) and remain in their last attained state.

At this time, limit valve LV6 is made by the earlier action above mentioned (i.e. the shifting of vacuum hose 31 to manifold 20 for operation in the pickup mode), and valve LV2 is made due to its initial condition. Therefore, pressurized air on line 250 passes through limit valves LV6 and LV2, and thence through shuttle valve S5. Passing of air through shuttle valve S5 causes pilot port P1 of power valve 60 (FIGS. 11, 12) to shift so that the suction cups extend cylinder 59 is activated by the 50 PSI supply. This action causes the cup cylinders (11a–11k) to extend to the supply bins 15a–15k (FIG. 4). As previously discussed, when the vacuum cups extend to the bins 15, 50 PSI is applied to one side of piston 41 of the cup advance cylinder 59 to overcome the 20 PSI that is constantly being applied to the opposite side of piston 41. As the pickups 11a–11k extend, each respectively releases associated limit valves LV1A to LV1K (FIG. 2) so that all become non-passing. It should be noted that as long as the valves LV1A to LV1K were in a passing state or before extension of pickups 11, the pilot port valve RV5 (FIG. 10B) was pressurized from line 275 through the closure of switch 201. A circular configuration of pilot port RV5 indicates that it has a spring return when it is not energized. The pressurizing of the relay valve RV5 is indicated by its shading.

Two flow paths RV5A' and RV5" are affected by the pressurizing of pilot port RV5 in lines 208, 210, respectively. The RV5A' flow path in line 208 symbolically indicates that it is plumbed passing (i.e. made passing by spring loading) but is held non-passing as long as the pilot port RV5 is pressurized. On the other hand, the flow path RV5A" in line 210, which symbolically indicates that it is plumbed non-passing, is in a passing state as long as relay pilot port RV5 is pressurized. Therefore, as soon as the cup cylinders 11 start to extend, they respectively release the limit valves LV1A to LV1K (FIG. 4). Accordingly, as soon as limit valves LV1A to LV1K are released, air pressure on line 275 is prevented from reaching the pilot port RV5, since limit valves LV1A–LV1K are now open. Flow path RV5A', which was held non-passing, now becomes passing so that pressure that was available on line 250 is now available on line 208, which pressurizes pilot port RV3A. The pressurizing of the pilot port RV3C causes flow path RV3A' in line 210, which was initially non-passing, to become passing. The two-way valve LV5 in line 210 is made or passing at this time due to the previous action of energizing the backstop cylinder 300, which caused backstop 52 to be positioned in a upright position. The closing of flow path RV5A" occurs in the following manner.

When the cup extend cylinder 59 was pressurized causing pickups 11 (FIG. 4) to extend, the jet sensor arrangement in conjunction with the vacuum pickup enabled a topmost battery plate/or separator element 49a (FIG. 4) to be captured. After the element 49a was captured, the suction cup 28 was retracted by withdrawing 50 PSI from the cup extend cylinder 59 (FIG. 3) so that the 20 PSI applied to the other end of the piston 41 caused it to retract as previously described. When the suction cups 28 are fully retracted, the limit valves LV1A to LV1K are again placed in the passing state (i.e. the piston rod 30 is retracted so that contact is made with two-way valves LV1A–LV1K) and pilot port RV5 (FIG. 10B) is again pressurized. When the suction cups 28 are fully retracted and switches LV1A to LV1K again become passing, flow path RV5A", which was plumbed non-passing, again becomes passing due to the repressurization of the pilot port RV5. Therefore, air pressure on line 250 passes through flow paths RV3A', RV5A" and limit valve LV5 onto line 210 to enable the shuttle valve S6 to shift and the pilot port P2A (FIG. 13) to become pressurized. The pressurization of the pilot P2A causes the activation of rotate cylinder 100 and piston rod 47 extends (FIG. 4) so that the vacuum manifold 20 rotates the suction cup 28 vertically to drop a position over the conveyor belt 29.

As the rotate cylinder 100 starts to extend thereby rotating the vacuum manifold 20 and pickups 11 to the vertical position, the limit valve LV2 (FIG. 9) is released to the non-passing state and pressurized air no longer passes along line 206 (FIG. 10A) to the shuttle valve S5 to pressurize the cup extend cylinder 59 (FIG. 11) through pilot port P1 of power valve 60. Therefore, spring 61 returns power valve 60 to its non-energized state. As is understood, the 50 PSI applied to one side of piston 41 was exhausted through circuit 4-3 as previously described with respect to the operation of FIG. 11. It will be understood that the pickups 11 are retracted at this time to prevent damate during rotation of manifold 20.

As the rotate cylinder 100 (FIG. 4) fully extends so that the captured member element 49a is directly over conveyor belt 29 (FIG. 4), limit valve LV3 (FIG. 9) is made passing and line 212 becomes pressurized. Air pressure along line 250 now passes through valve LV3 along line 212 to pressurize the relay pilot port RV4A. By pressurizing relay pilot port valve RV4A, flow path RV4A" in line 214 becomes passing to allow air pressure on line 280 to pass therethrough, and flow path RV4A' in line 202 becomes non-passing. Hence at this point in time, line 250 is no longer pressurized through switch 201.

When air pressure appears on line 214, shuttle valve S7 (FIG. 10B) is switched to allow pilot port P4A of power valve 90 (FIG. 14) to become pressurized. The pressure on pilot port P4A causes a shift of the vacuum from the vacuum pickup mode to the environment mode by activating vacuum cylinder 400 (FIG. 8). In other words, the vacuum hose 31 is shifted from the vacuum manifold 20 to the vacuum manifold 20a. This shifting causes the plates or separators 49, as the case may be, which are attached to the vacuum pickups 11 to be deposited onto the conveyor belt 29 (FIG. 5). Therefore, when the vaccum cylinder 400 is now shifted so that vacuum is no longer present at the various vacuum pickups 11, the limit valve LV7 will be made or passing because the vacuum hose 31 is now applying vacuum to manifold 20a. Since valve LV7 is now in a passing state, the line 218 (FIG. 10B) is pressurized from the pressurized air on line 290 via flow path RV4A". This causes shuttle valves S8 and S9 to be activated so that the pilot ports P3B and P2B of power valves 91, 93 (FIGS. 14, 13) to become pressurized. The pressurizing of the pilot port P2B activates rotate cylinder 100 to retract piston rod 47 (FIG. 4) in order to rotate vacuum manifold 20 and the pickups 11 back to the 35 degree position above the chutes 15, thereby causing valve LV3 to be released and making limit valve LV2 (FIG. 9). The pressurizing of port P3B causes the backstop cylinder 300 to be activated to cause the back stop 52 (FIG. 4) near the conveyor belt 29 to return to the 45° position thereby causing limit valve LV4 to again become passing and releasing limit valve LV5. This reorientation of the backstop 52 and the rotating vacuum manifold 20 will be to reposition these members for the next cycle of operation.

As soon as the backstop 52 is moved to its 45° position and valve LV4 is made, line 220 is connected to pressurized line 290 and shuttle valves S10 and S11 are activated so that pilot ports P5A of power valve 92 and relay pilot port RV4B become pressurized. The pressurizing of pilot port RV4B causes flow path RV4A' in line 202 (FIG. 10A) to again become passing, whereas flow path RV4A" in line 214 become non-passing. Accordingly, air pressure no longer is present on line 214. The pressurizing of pilot port P5A (FIG. 16) of power valve 92 causes belt advance cylinder 500 (FIG. 4) to extend the rack 54 upwardly to cause the pinion 54a (FIG. 5) to rotate clockwise so that conveyor belt 29 is indexed or moved approximately 7.5 inches to the right, or the distance to the next work station under pickup 11b and opposite chute 15b of the stacker 10. By this action, valve LV8 is again made or passing to initially condition the stacker 10 for a new cucle of operation. As understood, if a plate 49a is positioned on the conveyor belt 29 by the vacuum pickup 11a, indexing of the belt 29 will locate the plate 49a to the next station whereby a battery separator may be automatically placed thereon. Therefore, by successive indexing of the conveyor, a sandwich of alternate plates and separators, may be formed for eventual placement in a battery cell. While pressure existed on line 290, it caused the shuttle valve S12 to be switched thereby pressurizing the valve RV3B. The pressurizing of the pilot port RV3B closes flow path RV3A' in line 210 to its initial non-passing condition thereby opening line 210.

It should be understood that the present invention can be cycled in a manual other than an automatic mode of operation as above described. The manual mode is provided in order to enable the stacker to be cycled through its various operations one step at a time for use during maintenance of the stacker to observe its operation.

The manual mode is initiated by activating the switch 201 to its manual mode to close the bottom contacts as indicated by the dotted line. Line 295 thereby becomes pressurized from the air supply through the closed manual contacts of switch 201. By successively actuating each switch of the manual mode of the vacuum, backstop, belt cylinder, cups and rotate switches, lines 203, 205, 207, 209, 211, 213, 215, 217 and 219 can become successively pressurized to operate the stacker 10 in a step-by-step mode of operation. Emergency and cycle stopping of the stacker 10 is also provided through pressure line 275 so that shuttle valve S13 is activated to cause pilot port RV1B to be pressurized. This causes flow path RV1A' to be opened to prevent pressurized air from appearing on lines 250, 280 thereby effectively turning off the stacker 10 and preventing further cycling.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. An apparatus for removing a member from a plurality of members comprising:
   (a) first and second manifold means,
   (b) first and second pickup means wherein said first pickup means is coupled to said first manifold means, and said second pickup means is coupled to said second manifold means, (c) said first pickup means adapted to capture said member from said plurality of members, and said second pickup means adapted to absorb dust in an environment surrounding said apparatus, and (d) means for applying a negative pressure source alternately to said first and second manifold means, whereby said apparatus is operative in either an environmental or a pickup mode.

2. An apparatus in accordance with claim 1 further comprising:
means for stacking said plurality of members at an angle with respect to a vertical reference.

3. An apparatus in accordance with claim 2 further comprising:
means for rotating said first pickup and manifold means through an angle such that said pickup means is in substantial alignment with said stacking means.

* * * * *